Oct. 20, 1931.   A. J. ANDERSEN   1,828,238
BREAD PACKING MACHINE
Filed Nov. 19, 1928   3 Sheets-Sheet 1

INVENTOR.
AXEL J. ANDERSEN.
BY
Munn & Co.
ATTORNEYS.

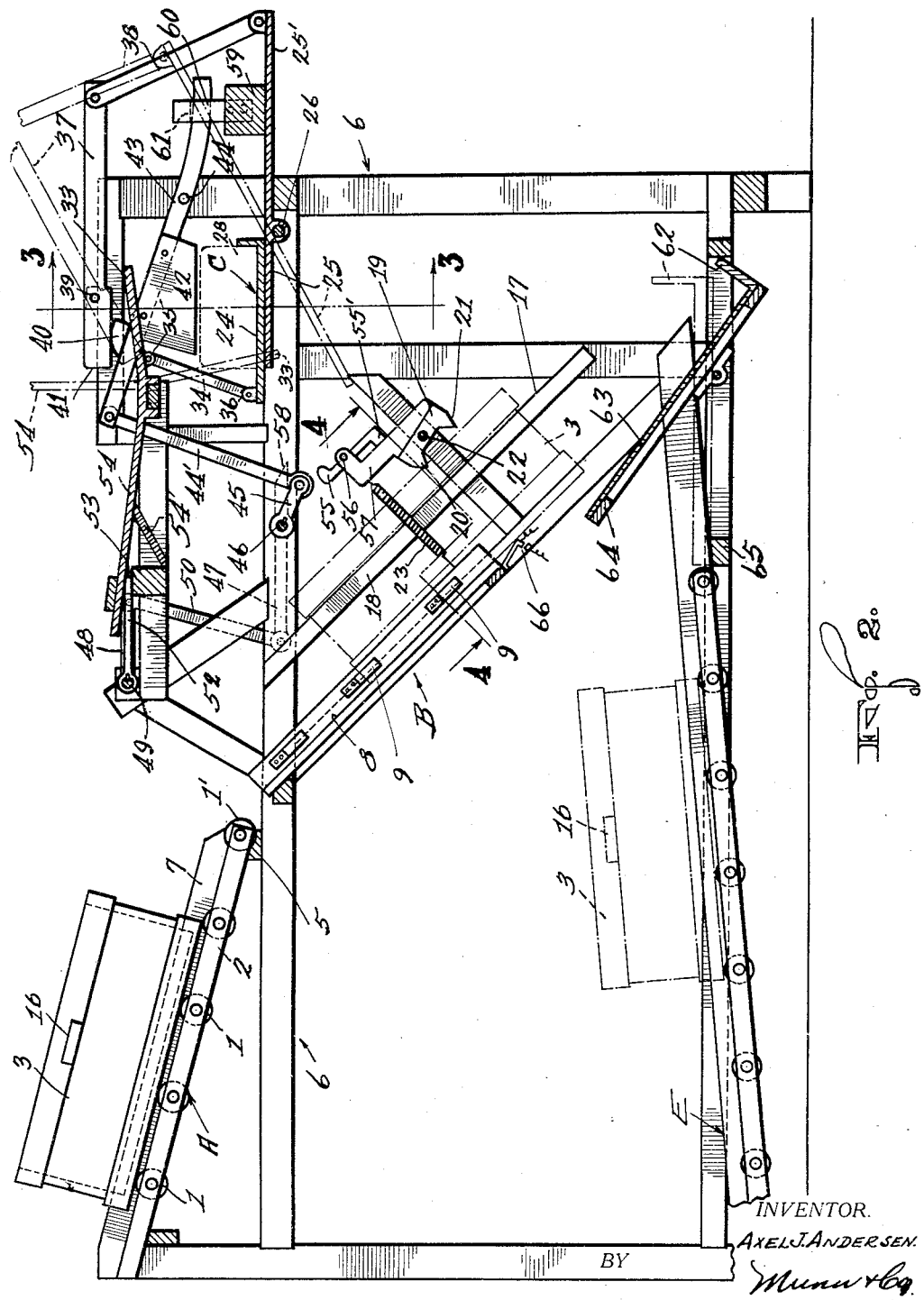

Oct. 20, 1931.    A. J. ANDERSEN    1,828,238
BREAD PACKING MACHINE
Filed Nov. 19, 1928    3 Sheets-Sheet 3
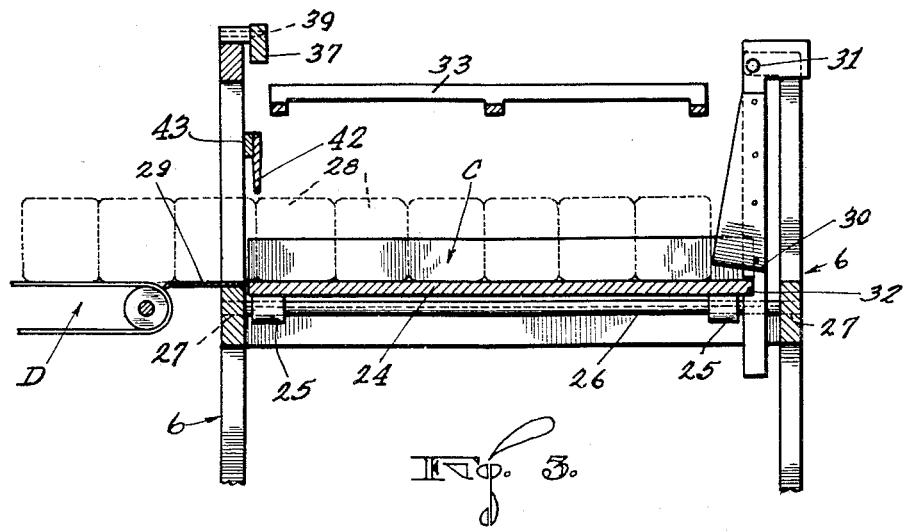
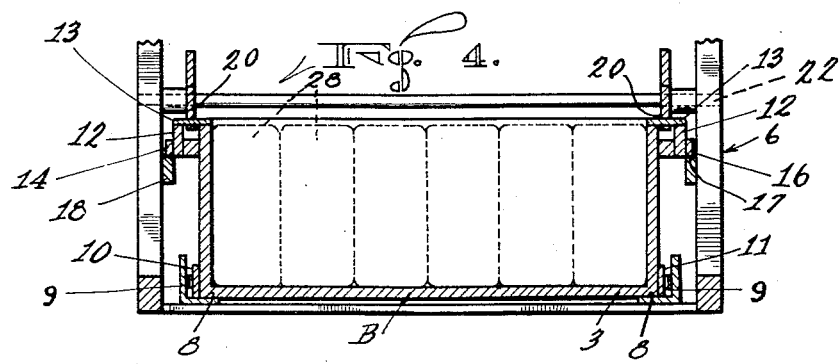
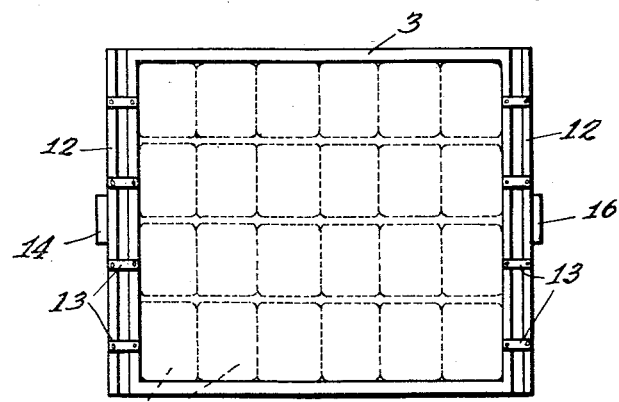
INVENTOR.
AXEL J. ANDERSEN.
BY
ATTORNEYS.

Patented Oct. 20, 1931

1,828,238

UNITED STATES PATENT OFFICE

AXEL J. ANDERSEN, OF SAN FRANCISCO, CALIFORNIA

BREAD PACKING MACHINE

Application filed November 19, 1928. Serial No. 320,523.

My invention relates to improvements in bread-packing machines and it consists of the combinations, constructions and arrangements hereinafter described and claimed.

An object of my invention is to provide a device for automatically packing bread in a predetermined manner, the operative power thereof being primarily that of gravity.

More specifically, I propose to intermittently convey a container down an incline and past a bread-dispensing apparatus which is operated by the weight of the bread.

A further object of my invention is to provide a bread-dispensing apparatus that will automatically function after a desired number of loaves of bread have been conveyed thereto, the bread being discharged into a container that is arranged in close proximity with the dispenser.

Moreover, I propose to provide a device of the type described which is simple in construction, durable and efficient for the purpose intended.

My invention is illustrated in the accompanying drawings forming a part of this application, in which Figure 1 is a plan view of the device;

Figure 2 is a longitudinal section on the line 2—2 of Figure 1;

Figure 3 is a transverse vertical section on the line 3—3 of Figure 2;

Figure 4 is a fragmentary section as indicated by the numerals 4—4 in Figure 2; and Figure 5 is a plan view of the container.

Figure 1:
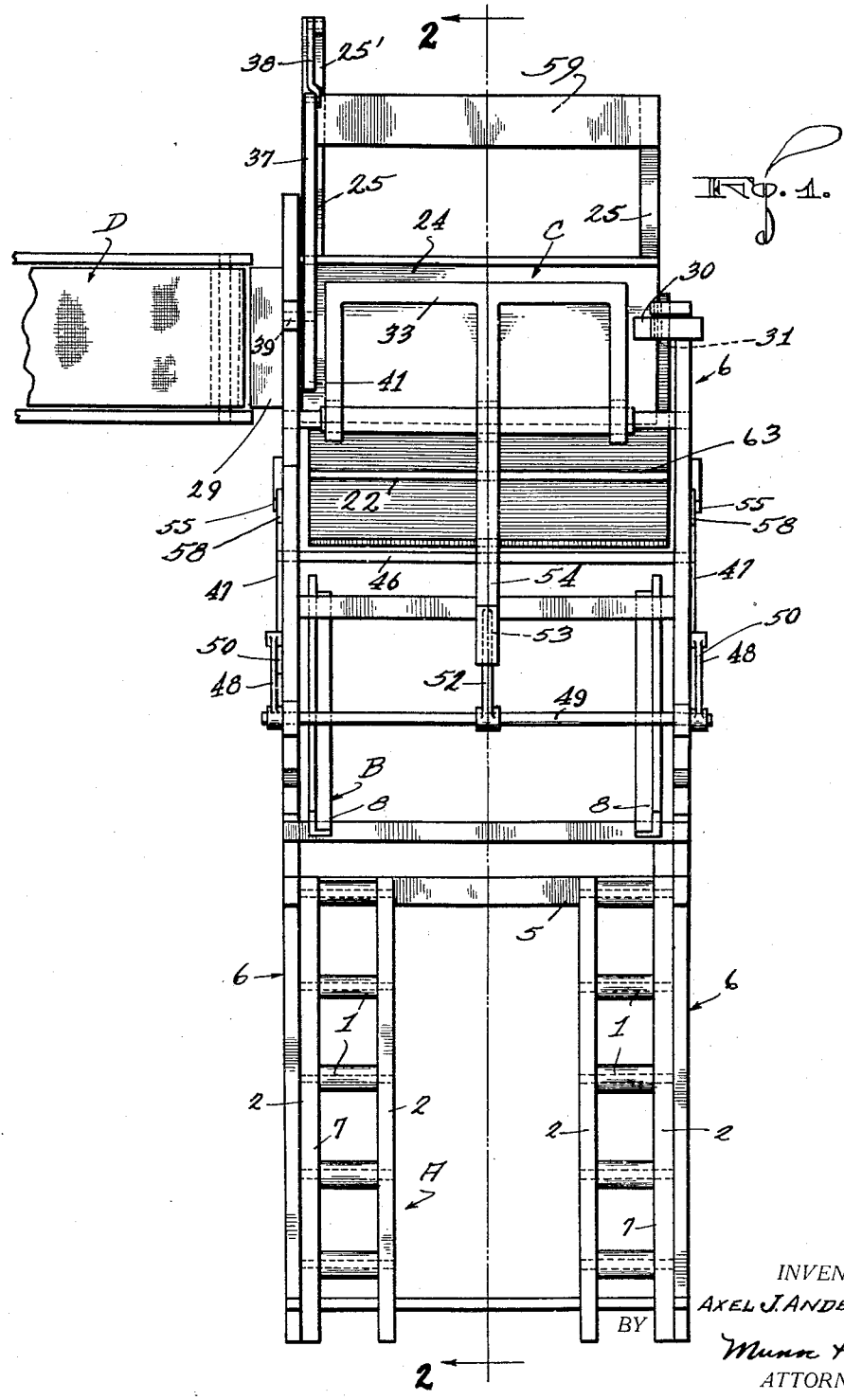

While I have shown only the preferred form of my invention, I wish it to be understood that various changes or modifications may be made within the scope of the claims without departing from the spirit of the invention.

In carrying out my invention, I provide a conveyor A for delivering empty bread containers to an inclined slideway B where they are advanced intermittently by a mechanism that will be hereinafter described. As the containers are advanced step by step, they are filled with bread by a dispenser C that is arranged thereabove, the dispenser in turn being supplied by a cross-conveyor D. The containers, after having been properly filled, are carried away from the machine by a conveyor E.

Referring now to Figures 1 and 2, it will be noted that the conveyor A comprises a plurality of rollers 1 that are disposed between supporting members 2 over which containers 3 are transmitted. The lower end of the conveyor is supported by a suitable member 5 that extends across the top of the frame generally designated at 6. The side walls 7 of the conveyor slightly project above the top plane of the rollers in order to prevent lateral movement of the containers during their travel down the incline.

As the containers 3 move over the roller 1', they are rotated about the horizontal axis of the roller until they contact with the bottom member 8 of the slideway B.

The sides of the slideway B have leaf springs 9 disposed thereon which bear against the sides 10 and 11 of the container. The pressure of the springs against the container tends to retard the movement of the container down the slideway.

The upper portion of the container is formed with U-shaped channels 12 secured thereto. In Figure 5, I show these channels as having bars 13 extending transversely thereacross for a purpose as will later be described.

Projections 14 and 16 extend laterally from the channel members 12 which are adapted to slide over the upper surface 17 of the rails 18. These rails extend substantially parallel with the slideway B.

Figure 2 clearly shows a dog 19 as being formed with two points 20 and 21 for engaging with the bars 13 as has been previously mentioned.

A shaft 22 extends across the machine and carries a dog similar to the one just described at the opposite end thereof. A spring 23 normally urges the point 20 into engagement with the bars 13. The point 21 is merely for the purpose of preventing the container from moving more than one space at a time should the point 20 fail to return to its normal position in time.

The dispenser C is substantially an L-shaped member 24 carried on brackets 25 which are pivotally mounted on a shaft 26. The ends of the shaft are mounted in bearings 27 as disclosed in Figure 3.

The conveyor D extends laterally from the dispenser C and is designed to deliver loaves of bread 28 thereto from any suitable bread-wrapping machine, not shown. An apron 29 serves to support the bread as it moves from the conveyor onto the dispenser.

A catch 30 is arranged at the opposite side of the machine from that of the conveyor D. The catch depends from its pivotal point 31 as illustrated in Figure 3. It is formed with a notched portion 32 for holding the member 24 in a fixed position. As the bread is forced onto the dispenser by the action of the conveyor D, the catch 30 is rotated about its pivot 31, and the member 24 is subsequently released. The weight of the bread will then tend to rotate the member 24 into the dotted line position as shown in Figure 1.

Directly above the dispenser C, I have disposed a frame 33, see Figure 1, which extends transversely across the machine and is so arranged as to sweep the bread from the member 24 into the container disposed therebeneath as the frame is rotated.

This is accomplished partly by a link 34 which is pivoted at 35 and 36 to the frame 33 and the member 24 respectively.

I have also provided a novel means for preventing the conveyor D from forcing bread onto the dispenser while it is in the process of discharging the bread into the container. As the end 25' of the bracket 25 moves upward, lever 37 is moved parallel therewith through the medium of lever 38. The fulcrum for the lever 37 is at 39. A cam edge 40 is depressed by the end 41 of the lever 37 as it is so rotated.

A knife-shaped member 42 is secured to a bar 43 which is pivoted at 44. It is apparent that as the cam 40 is depressed, the member 42 will pass down over the end of the conveyor D and thus prevent bread from being pushed onto the dispenser. As soon as the plate 24 returns to its normal position, the member 42 will again be raised and will permit the bread to enter upon the member 24.

One end of the bar 43 has a link 44' that is pivotally connected to an arm 45 which is carried by a shaft 46. Arm 47 is fixedly secured to the shaft 46 and is connected to an arm 48 on the shaft 49 by a link 50.

Figure 1 shows the shaft 46 as extending across the machine and carrying a finger 52 intermediate of its ends. The finger has its end 53 disposed directly beneath an arm 54 which extends from the frame 33.

It is evident from the construction that a depression of the link 44' will move the finger 52 in a counter-clockwise direction (in Figure 2), the movement of which will cause the finger to raise the arm 54 against a tension spring 54'. This action will also cause the frame 33 to sweep the bread from the dispenser C.

A member 55, see Figure 2, is pivotally mounted as at 56 on a projection 57 which extends from the dog 19. The arm 47 has a pointed member 58 formed integral therewith, the purpose of which will now be set forth.

As the link 44' is moved downwardly, the member 58 will rotate in a clockwise direction until it has reached a position below the member 55, and as soon as the shaft is rotated in the opposite direction, the member 58 will strike against the member 55. The lug 55' will then contact with the dog 19 and will lift the point 20 out of engagement with the bar 13. The container 3 is then advanced, the spring 23 instantly returning the point 20 into the path of the next bar 13. The container is then in proper position to receive another row of bread.

In order that the dispenser C may always return to a level position, I have arranged a counterweight 59 across the extended ends 25' of the supporting brackets 25. The end of the weight nearer the conveyor D has a vertical projection 60 which carries an integral lug 61 that extends over the end of the bar 43. This arrangement very effectively aids in returning the dispenser C to its normal position, and also in raising the member 55.

As the last bar 13 is cleared by the dog point 20, the container will continue down the slideway until it strikes the wall 62 of the trap 63. The weight of the container will be sufficient to rotate the trap until the end 64 thereof strikes against the stop 65. The container 3 will then automatically roll onto the conveyor E.

I prefer to operate the conveyor D by means of an electric motor in the conventional and well-known manner. However, some means must be provided to stop the conveyor unless a container be in its proper position on the slideway B. For this purpose, I have placed a contact switch 66 at one end of the slideway B that will be depressed as soon as a container is introduced into the slideway. This will instantly complete a circuit to the motor that has just been mentioned.

From the foregoing description of the various parts of the device, the operation thereof may be readily understood. Containers 3 are introduced into the slideway B by a gravity-operated conveyor A. The dog point 20 cooperates with the bars 13 of the container for controlling the advancement of the container.

During the meantime, bread has been advanced onto the member 24 by the conveyor D until the bread has pushed against the catch 30 with sufficient force to release the member 24 from the notched portion 32. The weight of the bread will then cause the member 24 to rotate into the dotted line position as shown in Figure 2. The frame 33, through the link 34, will tend to sweep the bread from the dispenser.

Simultaneously with the rotating of the member 24 about its horizontal axis, the knife member 42 is lowered into the path of the line of bread that is being advanced by the conveyor D. The member 58 is lowered into engagement with the under surface of the trip 55 as has been fully described. Its return movement will actuate the dog 19 and release the container 3 to its next position from which it is subsequently discharged onto the conveyor E.

Although I have shown and described the present invention as being used in connection with packing bread, it is obvious that my device may be readily used for packing articles of any description.

I claim:

1. A device for packing articles in a container consisting of an article dispenser, and means for delivering a predetermined number of articles to said dispenser, said dispenser being entirely operated by the weight of the articles, said dispenser discharging said articles into the container during each operation.

2. In a device for packing articles in a container, an article dispenser, and means for delivering articles to said dispenser, said dispenser being entirely operated by gravity, all of said articles on the dispenser being simultaneously discharged therefrom during each operation of said dispenser.

3. In a device for packing articles in a container, an article dispenser, means for delivering articles to said dispenser, said dispenser including a swingably mounted member for supporting the articles, said member being movable into an inclined position so that the articles may slide therefrom by gravity when a predetermined number of articles have been delivered thereto.

4. In a device for packing articles in a container, an article dispenser, means for delivering articles to said dispenser, said dispenser including a member swingably mounted about one of its axes, said articles being delivered to said member on one side of said axis, and means for normally holding said member in a nonswingable position, said articles abutting against said holding means for releasing the same after a predetermined number of articles have been delivered to said member, said member being swingable into an inclined position so that the articles may slide therefrom by gravity.

5. In a device for packing articles in a container, a dispenser having a swingably mounted member for supporting articles, means for delivering articles to said member, a pivotally-mounted stop for engaging with the side of the articles, and means interconnecting said supporting member with said pivotally-mounted stop for causing the latter to interrupt the supply of articles to said member when it is discharging.

6. In a device for packing articles in a container, a dispenser having a supporting member for articles, said member being swingably-mounted and being movable into an inclined position by the weight of the articles, means for feeding articles to said member, a frame extending along the length of said member, and means interconnecting said member with said frame and actuated by the moving member so as to cause the frame to sweep all of the articles from said supporting member as the dispenser is moved.

7. A device for packing articles in a container and including an article dispenser, means for delivering articles to said dispenser, means for guiding a container beneath the discharge of said dispenser, means for releasing said dispenser at intervals, and means controlled by the movement of the dispenser for releasing the container so that the same may move by gravity into a new position.

8. In a device for packing articles in a container, an article dispenser, means for delivering articles to said dispenser, and a swingably-mounted member engaging with said dispenser for normally holding the same in a non-discharging position, said articles being abutted against said member for releasing said dispenser, said member being returned by gravity to engaging position with said dispenser.

9. An article-packing machine for packing articles in a container comprising article-feeding means, an entirely gravity operated article dispenser for receiving a row of articles consisting of a predetermined number, means for successively releasing a container with respect to said dispenser for permitting an intermittent movement by gravity for successively receiving rows of articles, article-controlled means for releasing said dispenser, said dispenser when moved actuating said container-releasing means, and means for carrying away the container when packed with articles.

10. An article-packing machine for packing articles in a container comprising article-feeding means, an entirely gravity operated article dispenser for receiving a row of articles from said feeding means, article-controlled means for releasing said dispenser, said dispenser when released feeding the row of articles into said container, means controlled by said dispenser for stopping the articles from said article-feeding means when said dispenser is operating, and means controlled by said dispenser for releasing the container to permit it to move to a position to receive the next row of articles.

11. An article packing machine for packing articles in a container comprising article-feeding means, an entirely gravity operated article dispenser for receiving a row of articles from said feeding means, article-controlled means for releasing said dispenser, said dispenser when released feeding the row of articles into said container, means controlled by said dispenser for stopping the articles from said article-feeding means when said dispenser is operating, means controlled by said dispenser for releasing the container to permit it to move to a position to receive the next row of articles, and means actuated by the dispenser for moving the articles therefrom when said dispenser is released.

12. A device for packing articles in a container consisting of an article dispenser, said dispenser being entirely operated by the weight of the articles, means for guiding a container by gravity, when released, with respect to said dispenser so as to receive articles therein from the discharge of said dispenser, and means for releasing the container for permitting it to move.

13. A device for packing articles in a container consisting of an article dispenser, said dispenser being entirely operated by the weight of the articles, means for guiding a container by gravity, when released, with respect to said dispenser after each operation of the latter so as to cause said dispenser to deliver articles from its discharge to different parts of the container, and means for releasing the container for permitting it to move.

AXEL J. ANDERSEN.